(No Model.)

L. P. JENKS.
COFFEE POT.

No. 310,204. Patented Jan. 6, 1885.

WITNESSES
Richard W Shea
Charles J. Kidney

INVENTOR
Lemuel Pope Jenks.

United States Patent Office.

LEMUEL POPE JENKS, OF BOSTON, MASSACHUSETTS.

COFFEE-POT.

SPECIFICATION forming part of Letters Patent No. 310,204, dated January 6, 1885.

Application filed December 26, 1882. (No model.)

*To all whom it may concern:*

Be it known that I, LEMUEL POPE JENKS, a citizen of the United States, residing at Boston, in the county of Suffolk and State of Massachusetts, have invented a new Coffee and Tea Pot, of which the following is a specification.

The object of my invention is to provide a coffee and tea pot in which a strainer keeps the coffee-grains and tea-leaves separate from their respective infusions, the strainer being elevated or depressed at pleasure, and being double or single. The communication between the pot and its spout is also peculiar, and the object is to give at pleasure a distinctive character to different infusions of the same grains or leaves, to furnish a clear and limpid infusion, and to retain in all cases the peculiar aroma respectively characteristic of coffee and tea properly prepared, and thus to present a scientifically-constructed, cheap, easily-managed, and effective device for preparing coffee and tea.

Figure 1:
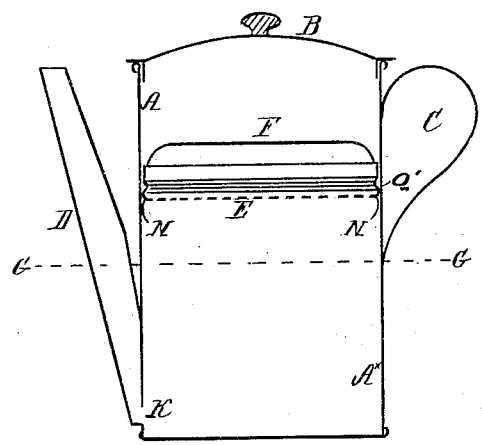
Figure 2:
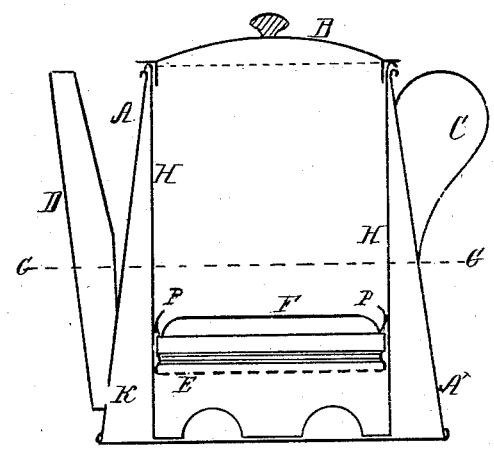
Figures 3, 6, 7:
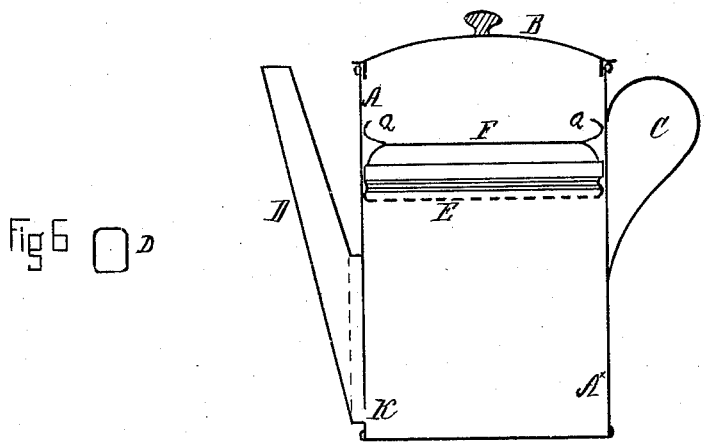
Figures 4, 8:
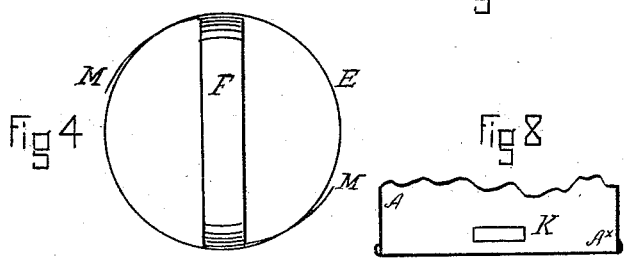
Figure 5:
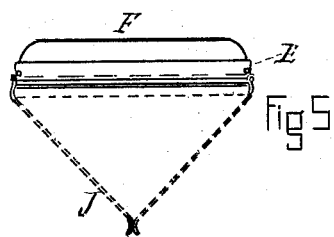

In the drawings, Figure 1 is a view, in vertical section, of one form of my coffee-pot with the strainer arranged to produce aromatic coffee-liquid. Fig. 2 is a similar view of another form of my pot with the strainer arranged to produce coffee-liquid of another character. Fig. 3 is a similar view of the kind of pot shown in Fig. 1, with a different connection of the spout and the pot. Fig. 4 is a view from above of the sliding ring and its handle, hereinafter described. Fig. 5 is a side view of my double filter. Figs. 6 and 7 are horizontal cross-section views of the spout D at the bottom and half-way up, respectively. Fig. 8 is a front view of the spout-aperture of the pot-body with the spout removed.

In Figs. 1, 2, and 3, A A$^x$ is the pot-body, which, like the rest of the device, I prefer to make of tinned iron of greater or less thickness. B is the cover; C, the handle; D, the spout, and E the strainer with its handle F. (See also Figs. 4 and 5.) G G, (dashed lines,) Figs. 1 and 2, is the line of the top of the liquid coffee when prepared ready for use.

H H, Fig. 2, is a cylinder of diameter just sufficient to enter into the mouth of the pot A A$^x$, and is called the "strainer-cylinder." It reaches from the top to the bottom of the pot, on the latter of which it rests, and has four, (two seen in Fig. 2,) more or fewer, notches, of semicircular (or any other) shape, at the lower end of the cylinder. This cylinder H H has no bottom, and I sometimes provide it with a horizontal flange extending over the top of the pot all round. The strainer E is a ring of tinned iron, and the handle F (of the same material or of wire) is firmly fastened to its upper edge. It is provided with a piece of cotton, linen, or woolen cloth stretched taut across its bottom edge, (see the bottom line of the part E,) and called the "filter." This cloth I prefer to fasten by means of a string round the outside of the ring E, and thus make a packing, Q$^2$, of the ring, between the latter and the cylinder H H in Fig. 2, or the cylindrical pot-body in Fig. 1, to either of which it is essential that my filter-ring or strainer E should closely fit, so that it may, in combination with the enveloping-cylinder, make a containing-vessel; but I sometimes use a wire ring, which sets inside the ring E on the head shown, (just below the center, horizontally of the part E.) This wire ring I use on the form shown in Fig. 5, and thus, with a cloth attached to it, make the upper filter, which is the coarser woven of the two filters therein shown. In this Fig. 5, J is a bag of any kind of cloth finer than that of the upper filter, and it is fastened at its top round the outside of the flat ring E.

At the point K, Figs. 1, 2, and 3, is seen a horizontal slit in the side of the pot-body more or less close to the bottom of the pot. This is covered in Figs. 1, 2, and 3, by the lowest portion of the spout D. The spout, circular in horizontal section at its top, is slightly flattened to the shape shown in Fig. 6 half-way down, being at its bottom flattened still more to the shape shown in Fig. 7 in the form of my invention shown in Figs. 1 and 2.

In Fig. 3 I keep the spout circular (in section) through its whole length, and fasten it at its lower end to a piece of metal (see Fig. 3 at that point) whose horizontal section shows an arc of a circle a little larger than that of the pot-body, and which piece of metal, having its perpendicular edges bent on the lines, respectively, of a radius of its circle toward the pot-body, is soldered firmly to the side of the pot.

Operation: The strainer E, being taken by its handle F, is slid up or down, and remains, when the filter-edge packing is wet, where it is left. Though I sometimes fasten (at one end) one, two, or more horizontal springs on the upper edge of the flat ring E, with their loose ends projecting slightly beyond the circle described by the ring, as shown in Fig. 4 at the points M M, I do not confine myself to any particular number or axial direction of my springs, which I also sometimes attach to the handle F. (See N N, Fig. 1, also P P, Fig. 2, and Q Q, Fig. 3.) If only the easily-extractible aromatic qualities of the coffee-grains (the caffeine and the essential and aromatic oils) are desired, I place the strainer at or near the point at which it is shown in Figs. 1 and 3, anywhere above the proposed level—say the line G G—of the prepared coffee-liquid. The boiling water, being then poured into the pot, passes through the ground coffee-grains, heretofore placed on the filter-cloth, and, percolating through the latter, rests on the pot-bottom. If I wish, what many prefer, a slightly-bitter taste in addition, I, before pouring on the boiling water, by means of the handle F, press the strainer E down to the position shown in Fig. 2, and the coffee-grains soaking in the coffee-liquid part with the soluble natural saccharine portion of the beans, slightly burned, as it is, in the roasting of the beans, and therefore somewhat bitter, (so as to have the taste and flavor of caramel,) and thus the coffee-liquid has the desirable slight bitterness. I sometimes place a screw, held by a bar fastened across the top of the cylinder H H or of the pot-body, in the axial center of either, and, passing it through a nut, (held by radiating arms in the center of the ring E,) screw the ring up or down instead of pushing or pulling it. The slit K being (until the coffee-liquid is almost entirely poured out) below the level of the liquid, the latter forms (as with sewer-traps and other devices of that kind) a trap which prevents, in conjunction with the cover B, (which of course has heretofore been put on as shown in the figures,) any escape of the volatile aroma.

The use of the double filter (shown in Fig. 5) is this: The upper filter, being fastened on taut to the ring, has a comparatively limited area of filtration, and as all the boiling water must, with this invention of mine, pass, as it should to extract all the aromatic qualities, through the coffee-grains, some trifling delay in preparing the coffee-liquid, objectionable when haste is required, might result in making the coffee. Therefore, with this double filter I make the upper filter of fabric somewhat coarse, so that the liquid passes readily through, but with it would pass the finest portion of the coffee-grains, which would make the liquid turbid. I therefore with this form of my invention, add the lower filter, J, of fabric woven finer, which, while permitting the instantaneous passage of the made coffee, perfectly and completely arrests the finely-ground substance of the coffee-beans, which is not sufficient in quantity, though it may soak in the made coffee, to embitter it.

I do not confine myself to a cylindrical shape with my pot-bodies or my strainer-cylinders; but sometimes make them hexagonal or of other shape in horizontal section, making my ring E conformably.

I do not confine myself to any particular height from the bottom of the pot of my slit K.

I do not claim any cup-shaped device with filtering bottom supported at defined heights by projections and notches.

I claim—

The ring E, with its filter or filters of circular or other shape, and having the springs Q, in combination with and fitting tightly into a device continuously surrounding it, of the same or similar shape in horizontal section, in which it slides, whether the latter be the pot-body or a tube placed in the same, the said ring and filter being adjustable at any altitude above the bottom of the pot and retained there by springs (which I thus include in my combination, as claimed) attached to the ring or its handle, all constructed and arranged substantially as described and shown.

LEMUEL POPE JENKS.

Witnesses:
JAS. B. BELL,
J. S. SANBORN.